US007663649B2

(12) United States Patent
Takemoto et al.

(10) Patent No.: US 7,663,649 B2
(45) Date of Patent: Feb. 16, 2010

(54) INFORMATION PROCESSING DEVICE AND METHOD FOR AIDING CONTROL OPERATIONS RELATING TO CONTROLLING THE POSITION AND ORIENTATION OF A VIRTUAL OBJECT AND METHOD FOR CHANGING THE POSITIONING AND ORIENTATION OF A VIRTUAL OBJECT

(75) Inventors: Kazuki Takemoto, Kanagawa (JP); Shinji Uchiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/615,941

(22) Filed: Jul. 10, 2003

(65) Prior Publication Data

US 2004/0021664 A1    Feb. 5, 2004

(30) Foreign Application Priority Data

Jul. 31, 2002   (JP) ............................. 2002-223282

(51) Int. Cl.
*G09F 5/00* (2006.01)
(52) U.S. Cl. ................................................... 345/633
(58) Field of Classification Search ................. 345/632, 345/633
See application file for complete search history.

(56) References Cited

U.S. PATENT DOCUMENTS 6,552,722 B1 *  4/2003  Shih et al. ................... 345/419
6,792,398 B1 *  9/2004  Handley et al. ............. 345/419
6,803,928 B2 * 10/2004  Bimber et al. .............. 345/419
7,084,887 B1 *  8/2006  Sato et al. ................... 345/633
2002/0140709 A1 * 10/2002  Sauer et al. ................. 345/633

OTHER PUBLICATIONS

Yoshifumi Kitamura and Fumio Kishino, Consolidated Manipulation of Virtual and Real Objects, Sep. 1997, Proceedings of the ACM symposium on Virtual reality software and technology, pp. 133-138.*
Blaine Bell, Steven Feiner, and Tobias Hollerer, View Management for Virtual and Augmented Reality, 2001, Proceedings of th 14th annual ACM symposium on User interface software and technology, pp. 101-110.*

(Continued)

*Primary Examiner*—Jeffery A Brier
(74) *Attorney, Agent, or Firm*—Fitzpatrick, Cella, Harper & Scinto

(57) ABSTRACT

An information processing device, for aiding operations relating to position and orientation of a virtual object positioned in three-dimensional space, comprises: an image-taking unit for taking images in real space in order to display the virtual object in a superimposed manner on real space; a synthesizing unit for synthesizing a virtual object with the taken image; an operating unit for operating the position and orientation of the virtual object; an aiding unit for obtaining a three-dimensional position of real space from external instructions, and obtaining a constraining shape for aiding in operations for the position and orientation of the virtual object; wherein the position and orientation of the virtual object are operated by instructions from the operating unit, based on constraint conditions based on the constraining shape obtained by the aiding unit. Thus, constraining shapes can be dynamically created in a compounded space, and virtual objects can be readily operated using constraining shapes even where constraining shapes have not been registered beforehand.

2 Claims, 13 Drawing Sheets

OTHER PUBLICATIONS

Daniel G. Aliaga, Virtual Objects in the Real World, 1997, Communications of the ACM, pp. 49-54.*

Yoshifumi Kitamura, Amy Yee, and Fumio Kishino, A Sophisticated Manipulation Aid in a Virtual Environment using Dynamic Constraints among Object Faces Presence, Oct. 1998, vol. 7, No. 5, by the Massachusetts Institute of Technology, pp. 460-477.*

Gudrun Klinker, Didier Stricker, and Dirk Reiners, Augmented Reality: A Balance Act between High Quality and Real-Time Constraints, 1999, by Technical University of Munich, Germany, Fraunhofer Project Group for Augmented Reality at ZGDV, Germany.*

Axel Pinz, Consistent Visual Information Processing Applied to Object Recognition, Landmark Definition, and Real-Time Tracking, 2001, by Graz University of Technology, Institute of Electrical Measurement and Measurement Signal Processing, Austria.*

Hirokazu Kato, Mark Billinghurst, Koichi Asano, and Keihachiro Tachibana, An Augmented Reality System and its Calibration based on Marker Tracking, "Journal of Japan Virtual-reality Society", 1999, vol. 4, pp. 607-616.*

IBM Technical Disclosure Bulletin, Sep. 1997, vol. 40, No. 9, pp. 79-82.*

Terrence Fernando, Norman Murray, Kevin Tan, Prasad Wimalaratne; Software Architecture for a Constraint-based Virtual Environment; Year of Publication 1999; Virtual Reality Software and Technology, Proceedings of the ACM symposium on Virtual reality software and technology; pp. 147-154.*

Mingxian Fa, Terrence Fernando, Peter M. Dew; Interactive Constraint-based Solid Modeling using Allowable Motion; Year of Publication: 1993; ACM Symposium on Solid and Physical Modeling, Proceedings on the second ACM symposium on Solid modeling and applications; pp. 243-252.*

* cited by examiner

INFORMATION PROCESSING DEVICE AND METHOD FOR AIDING CONTROL OPERATIONS RELATING TO CONTROLLING THE POSITION AND ORIENTATION OF A VIRTUAL OBJECT AND METHOD FOR CHANGING THE POSITIONING AND ORIENTATION OF A VIRTUAL OBJECT

BACKGROUND OF THE INVENTION

1. Field of the Invention

The present invention relates to operating a virtual object in compounded real space.

2. Description of the Related Art

With regard to operating a virtual object using an operating device capable of six-degree-of-freedom operations, there is a method for aiding operations so that the operations made by the user are those desired by the user, by using limited physical laws. For example, in the event of attempting to move a virtual object placed on a plane in a certain virtual space to a different position on the same plane, instead of moving the virtual object by reflecting the six-degree-of-freedom operations input from the user without change, the virtual object is moved over the two-dimensional plane while imitating gravitational and collision effects, which results in operations more intuitive to the user. Also, with regard to performing rotating operations on the plane, restricting the rotations to those on a single axis wherein a normal vector perpendicular to the plane serves as the axis realizes the operations intended by the user more than simultaneously operating parallel movement components and tri-axial rotations all at the same time. Now, a plane which provides the restrictions on the operations of the virtual object by means of a single plane is referred to as a "constraining plane", and a collection of constraining planes, configured of multiple planes, is referred to as a "constraining shape".

Conventionally, the virtual object in the virtual space was modeled beforehand and input, and the model was used as a constraining shape. In the event of realizing this method in virtual space, a virtual object and a constraining shape are represented in a single space, so setting the constraining shape was simple. On the other hand, with realizing a compounded space, precise position of the two spaces, i.e., real space and virtual space, is a crucial element, requiring accurate numerical expression model representations or shape model representations on the real space in order to correlate the constraining shape to the real space. The reason is that the model to be set to the constraining shape cannot be something which the user sets by eye estimation but rather must be a model corresponding to the shape of the real space. In the event that the virtual object is operated using a numerical expression model of a plane not matching a plane in the real space, as the constraining plane, spatial non-continuity between the virtual space and real space occurs, such as the virtual object floating above or moving below the plane in the real space. Upon experiencing such non-continuity, the user will feel that the inability for objects in the real space to affect the virtual object is unnatural, and may not be able to perform intuitive operations. However, precise modeling of constraining shapes in the real space requires that margin of error in the input of geometrically accurate shapes and in the environment to be realized (margin of error in sensor measurement, margin of error with regard to displacement of sensors, etc.) has to be taken into consideration as well, so realization has been difficult.

Thus, there has been the need to prepare precise numerical expression models and shape models beforehand in order to realize the method for aiding operations of virtual objects by affecting objects in real space, and further, this operating method could only be used where models have been prepared.

SUMMARY OF THE INVENTION

The present invention has been made in light of these problems, and accordingly, is an object of the present invention to enable dynamic creating of constraining shapes in a compounded real space, and to enable easy operating of virtual objects using constraining shapes even where constraining shapes have not been registered beforehand.

In order to achieve the above objects, according to a first aspect of the present invention, an information processing device for aiding control operations relating to controlling the position and orientation of a virtual object comprises image-capturing means for capturing a real image in real space, virtual image generation means for generating a virtual image of a virtual object according to the position and orientation of the image capturing means and superimposed means for superimposing the generated virtual image with the captured real image. The device also comprises determination means for determining an input of a constraining shape or an operation of the virtual object, inputting means for inputting three-dimensional position information of a plurality of positions inputted by moving an operating unit in the real space by the user, the operating unit being capable of measuring the position and orientation in the real space, setting means for setting a constraining shape by using a shape generated based on the inputted three-dimensional position information in case of the input of the constraining shape, and operating means for performing an operation controlling the position and the orientation of the virtual object based on the constraining shape in accordance with a user's instruction in case of the operation of the virtual object.

According to another aspect of the present invention, an information processing method for changing the position and orientation of a virtual object in mixed reality space obtained by combining a real space and a virtual space comprises the steps of obtaining three dimensional position information of a plurality of positions designated by an operating unit moved by a user in the real space, the operating unit being capable of measuring the position and orientation, determining an input of a constraining shape or an operation of the virtual object, obtaining a constraining shape by using a shape generated based on the obtained three-dimensional position information in case of the input of the constraining shape, changing the position and orientation of the virtual object according to instructions from the user, based on the obtained constraining shape as constraint condition in case of the operation of the virtual object, and combining an image of the virtual object generated according to the changed position and orientation, and the real image, to obtain a mixed reality image.

Further objects, features and advantages of the present invention will become apparent from the following description of the preferred embodiments with reference to the attached drawings.

DESCRIPTION OF THE PREFERRED EMBODIMENTS

First Embodiment

<1. Configuration>

The following is a detailed description of preferred embodiments of the present invention, with reference to the drawings.

Figure 1:
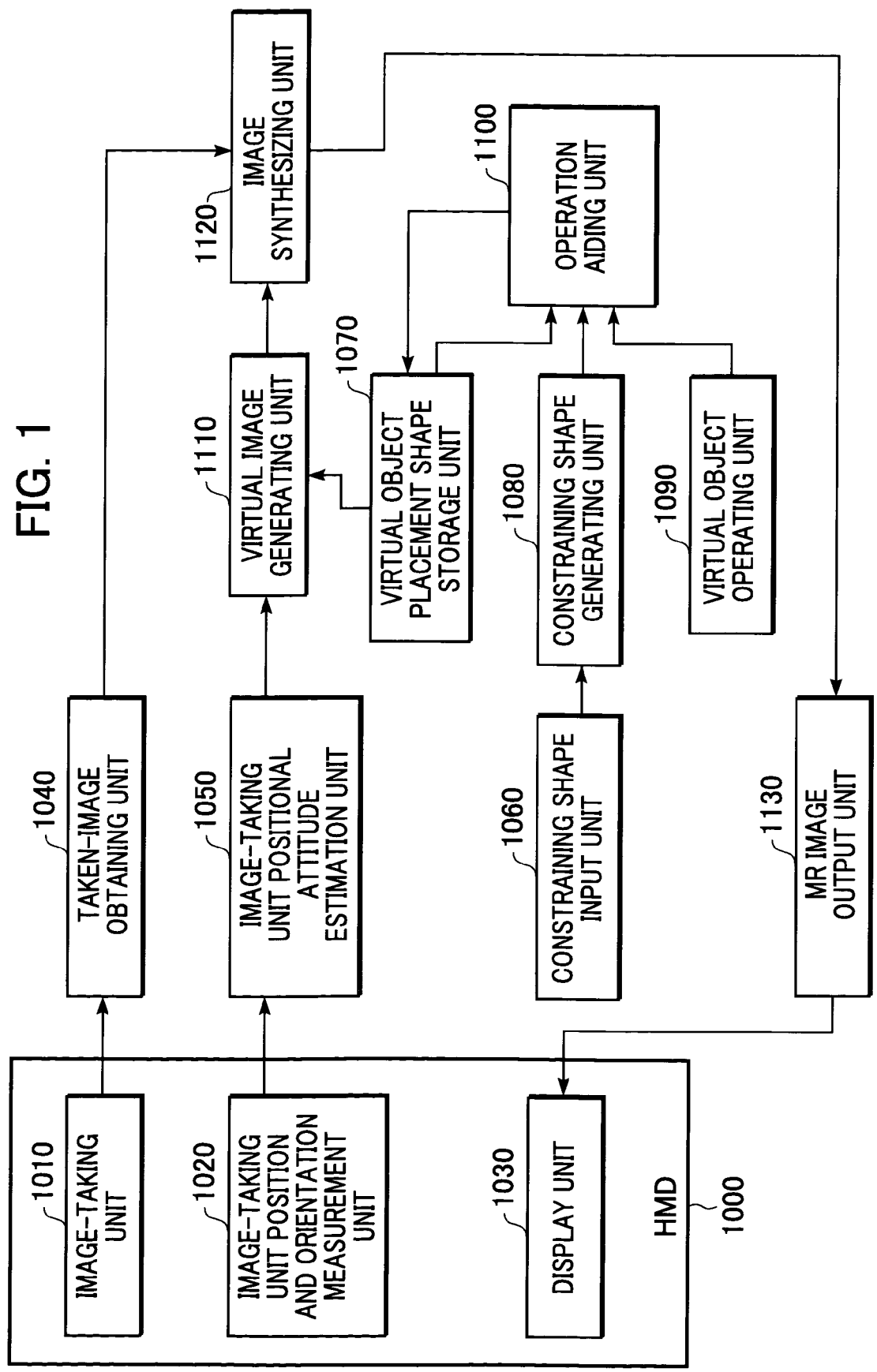
FIG. 1 is a block diagram illustrating the schematic configuration of an embodiment applying the operation aiding device for virtual objects in compounded real space.
Figure 2:
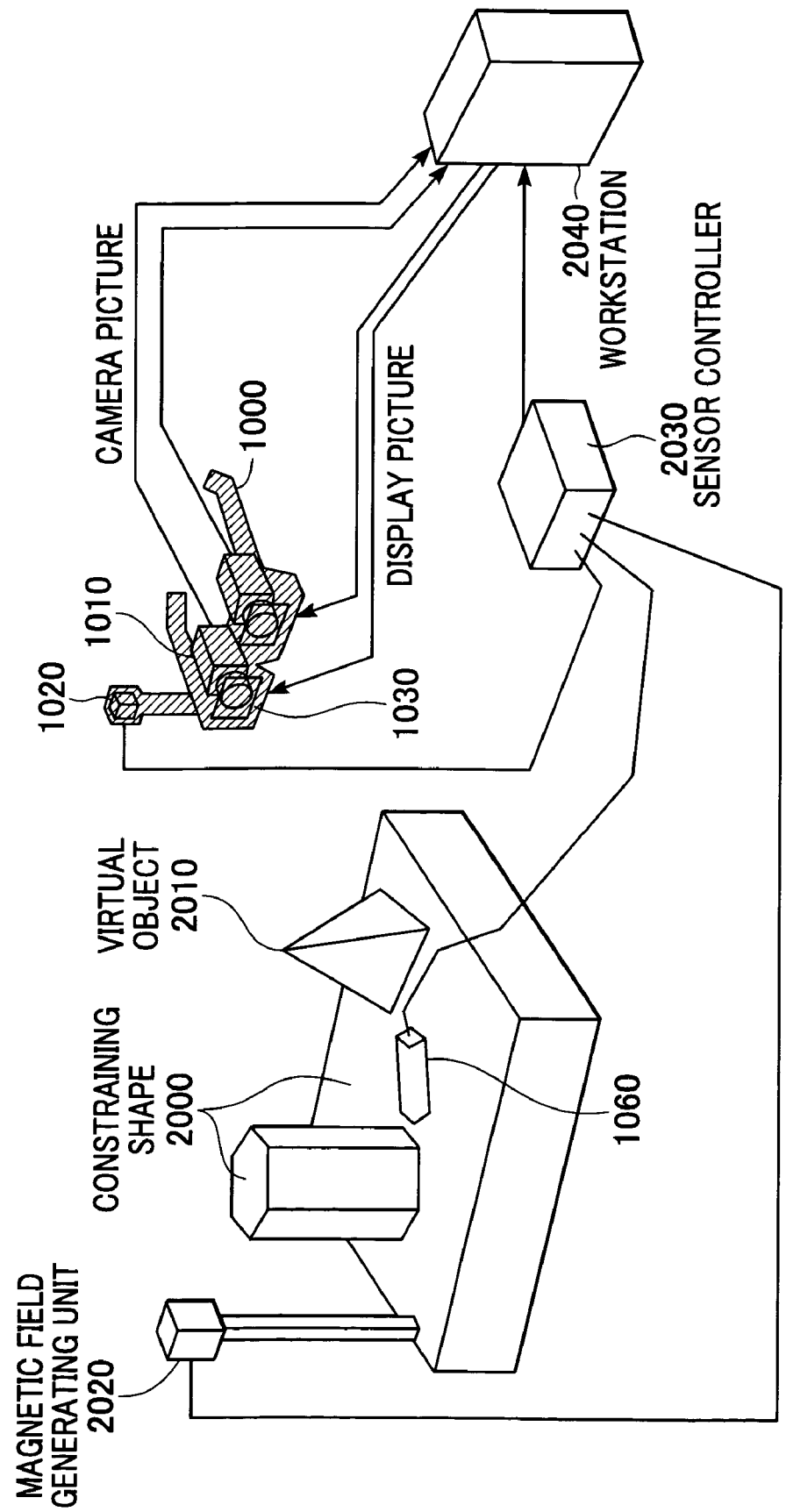
FIG. 2 is a model diagram illustrating the configuration of the device in the first embodiment.

FIG. 1 is a block diagram illustrating the schematic configuration of a first embodiment of the present invention, applying the operation aiding device for virtual objects in compounded real space. FIG. 2 is a model diagram illustrating the configuration of the device in the first embodiment.

An image-taking unit 1010, an image-taking unit position and orientation measurement unit 1020, and a display unit 1030, are attached and fixed to an HMD 1000. As shown in FIG. 2, two each of the image-taking unit 1010 and display unit 1030 are provided within the HMD, so that image-taking of the real space and recognition of the compounded real space can be performed in stereo. The user can view the stereo compounded real space images displayed on the display units 1030 (hereafter referred to as "MR (mixed-reality) images") with the HMD 1000 mounted on the head. The present invention is not restricted to taking and displaying stereo images, and is applicable to arrangements having at least one image-taking unit and display unit. Further, the present invention is not restricted to using an HMD 1000, and may be applied to any method wherein an image-taking unit and image-taking unit position and orientation measurement unit 1020 are fixed, and the user can view a display unit 1030.

The image-taking unit position and orientation measurement unit 1020 uses a 3D SPACE FASTRAK sensor manufactured by Polhemus in the present embodiment, and as shown in FIG. 2, measures the image-taking unit position and orientation by receiving a magnetic field generated by a magnetic field generating unit 2020 disposed in real space with the image-taking unit position and orientation measurement unit 1020 which is a receiving device fixed to the image-taking unit, and sending change in the received magnetic field to a sensor controller 2030. With the present invention, the image-taking unit position and orientation measurement unit is not restricted to a magnetic sensor, rather, any arrangement such as image-taking unit position and orientation estimation with an optical sensor or with image processing and so forth may be applied, as long as the position and orientation of the image-taking unit can be measured.

A taken-image obtaining unit 1040 holds images taken by the image-taking unit 1010 as image data.

An image-taking unit position and orientation estimation unit 1050 performs estimation of the image-taking unit position and orientation, based on the measurement values obtained from the image-taking unit position and orientation measurement unit 1020. Methods which can be applied for this estimation include: high-precision obtaining using characteristic points which have known positions in three-dimensional space, from the image held in the taken-image obtaining unit 1040; estimation of the margin of error of the sensor and correction thereby; and so forth.

A constraining shape input unit 1060 obtains the three-dimensional position of a constraining plane 2000 in real space, and inputs this to a constraining shape generating unit 1080. The present embodiment uses the stylus of the 3D SPACE FASTRAK sensor manufactured by Polhemus. This stylus is provided with one button (not shown) serving as a user interface for specifying the three-dimensional position of objects in the real space, and so forth. The present invention is not restricted to such three-dimensional pointing devices, rather, any arrangement may be applied as long as constraining shapes in real space can be precisely modeled, such as a method wherein image characteristics of real space are taken with a stereo camera to obtain the shape of an object.

Figure 3:
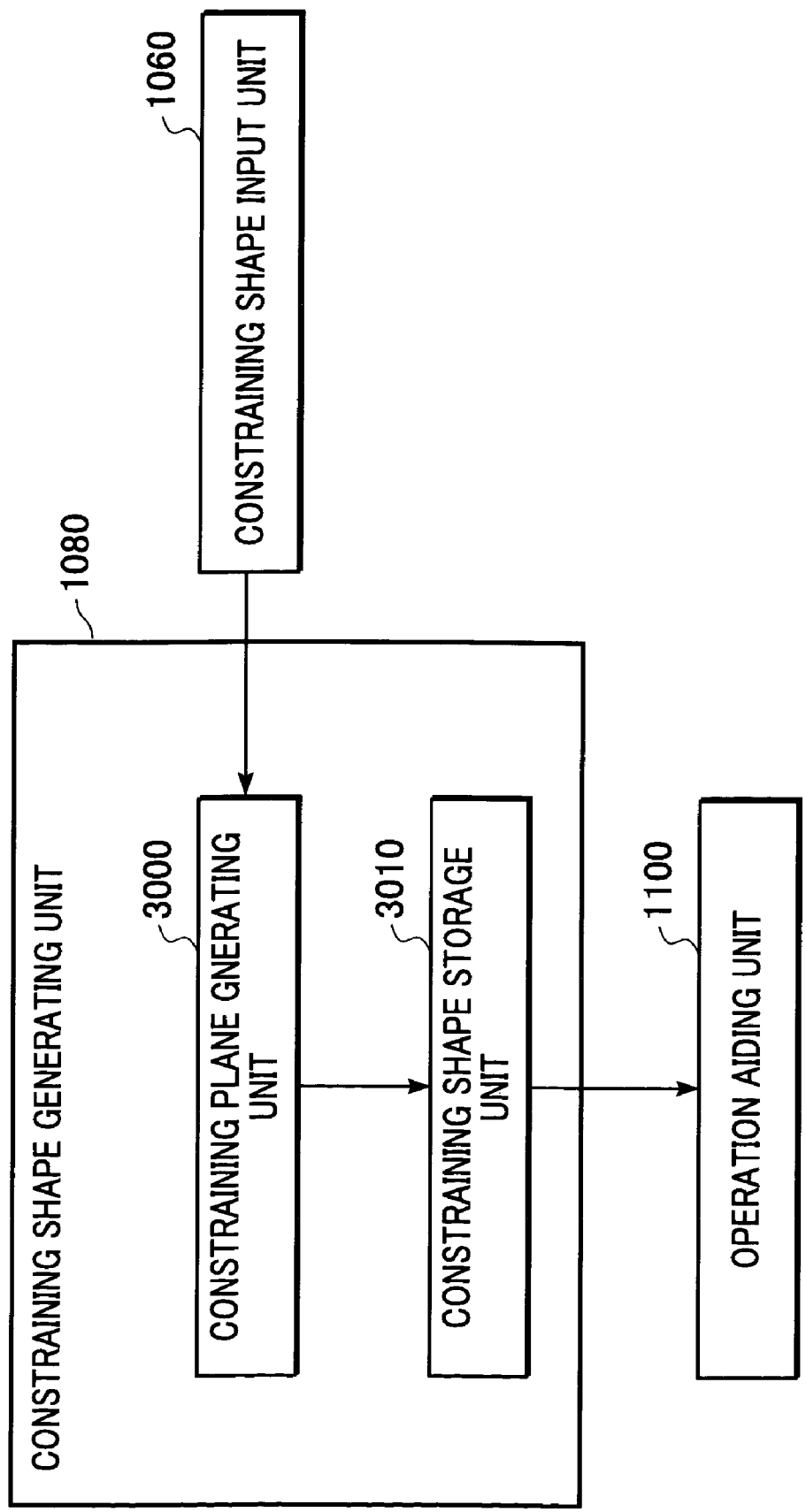
FIG. 3 is a block diagram illustrating the internal configuration of a constraining shape generating unit 1080.

The constraining shape generating unit 1080 synthesizes the input constraining plane with the constraining shapes accumulated therein so far, and stores this. FIG. 3 is a block diagram illustrating the inner configuration of the constraining shape generating unit 1080. A constraining plane generating unit 3000 generates planar numerical expression models or shape models from the three-dimensional position in the real space that has been input, thereby forming a constraining plane. The generated constraining shape is stored in a constraining shape storage unit 3010.

A virtual object operating unit 1090 is provided for performing six-degree-of-freedom operations of the virtual object 2010. With the present embodiment, the stylus of the constraining shape input unit 1060 is also used. The present invention is not restricted to the method sharing a stylus, and instead may comprise another FASTRAK sensor and use the stylus thereof. Further, other optical sensors or a two-dimensionally operated mouse or the like may be used instead of a FASTRAK sensor.

A virtual object placement shape storage unit 1070 stores the shape of the virtual object 2010, and the placement thereof in the scene. The stored virtual object 2010 is transferred to the operating aiding unit 1100, and the placement of the virtual object 2010 within the operation aiding unit 1100 or the shape thereof is changed according to the interference with the constraining shape 2000 and the operations input by a virtual object operating unit 1090.

Figure 4:
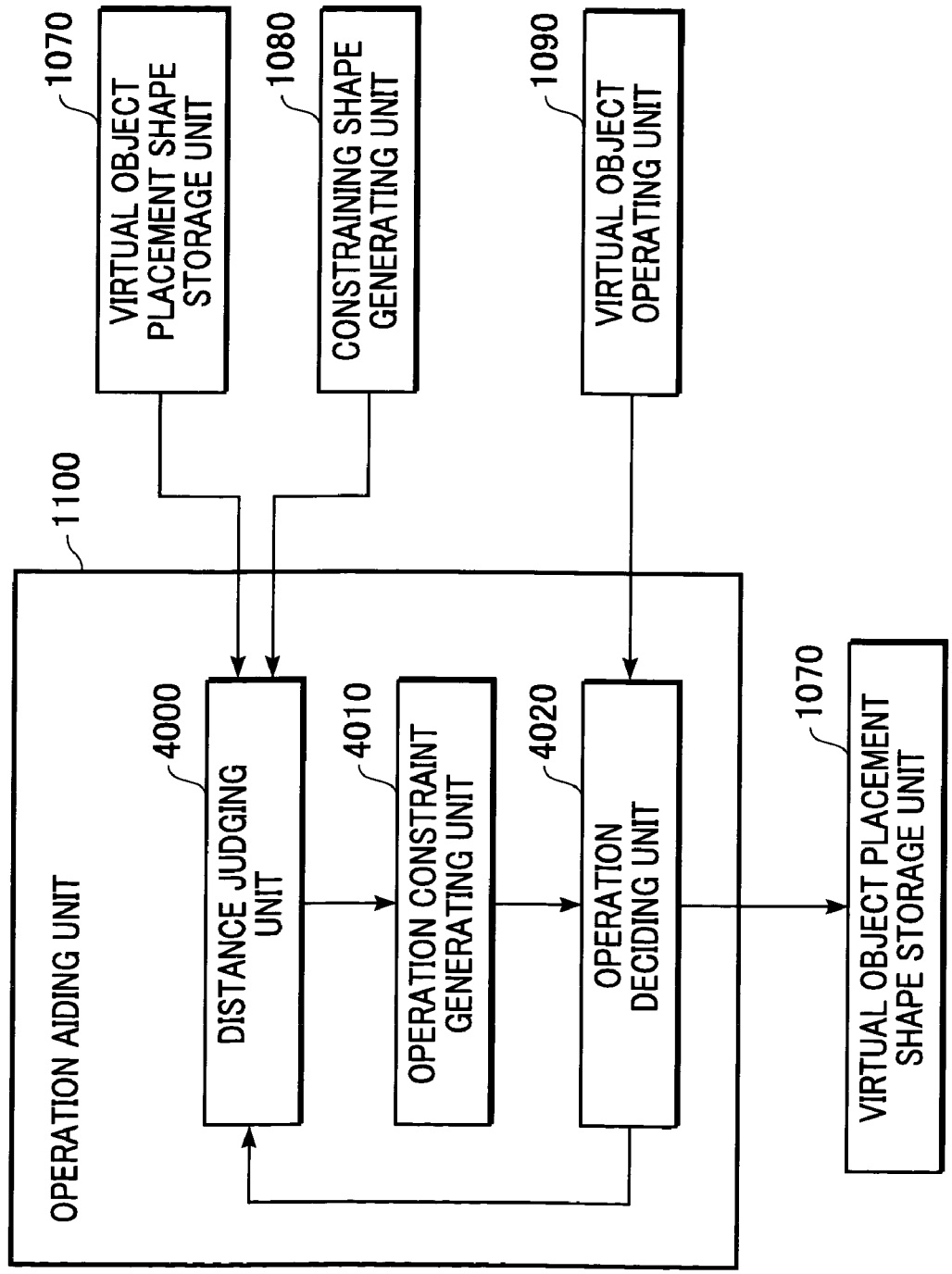
FIG. 4 is a block diagram illustrating the configuration of an operating aiding unit 1100.

The operation aiding unit 1100 generates operation restrictions from the information of the constraining shape generating unit 1080 and the virtual object placement shape storage unit 1070, and restricts operations being input from the virtual object operating unit 1090. FIG. 4 is a block diagram illustrating the configuration of the operation aiding unit 1100. A distance judging unit 4000 compares the distance between the virtual object 2010 to be operated which is stored in the virtual object placement shape storage unit 1070 and the constraining shape 2000 stored in the constraining shape generating unit 1080. An operation constraint generating unit 4010 generates operation restrictions with regard to the virtual object of interest, following the distance obtained by the distance judging unit and the constraining shape. An operation deciding unit 4020 decides the final operations based on the operation input from the virtual object operating unit 1090 and the operating restrictions generated at the operation constraint generating unit 4010, performs operations on the virtual object, and stores the resultant position and orientation of the virtual object in the virtual object placement shape storage unit 1070.

The virtual image generating unit 1110 performs two-dimensional projection of the virtual object 2010 on a display coordinates system, based on the image-taking unit position and orientation estimation unit 1050 and the virtual object placement shape storage unit 1070, and thus generates a virtual image.

The image synthesizing unit 1120 synthesizes the images obtained from the taken-image obtaining unit 1040 and the virtual image generating unit 1110.

The MR image output unit 1130 transfers the synthesized image to the display units 1030.

An image corresponding to the point-of-view-position of the user is displayed on the display units 1030 of the HMD 1000. The user can sense the compounded real space by viewing this image, and also operate virtual objects 2010 in the compounded real space at the same time.

Further, with the present embodiment, the aforementioned taken-image obtaining unit 1040, image-taking unit position and orientation estimation unit 1050, virtual object placement shape storage unit 1070, constraining shape generating unit 1080, operation aiding unit 1100, virtual image generating unit 1110, image synthesizing unit 1120, and MR image output unit 1130 are stored in a workstation 2040 shown in FIG. 2. The workstation 2040 has two separate video capture devices for capturing images of the image-taking unit, and two separate picture output devices, in addition to the basic components. However, the present invention is not restricted to such a workstation, and a computer having the same functions will suffice.

<2. Procedures for Processing>

Figure 5:
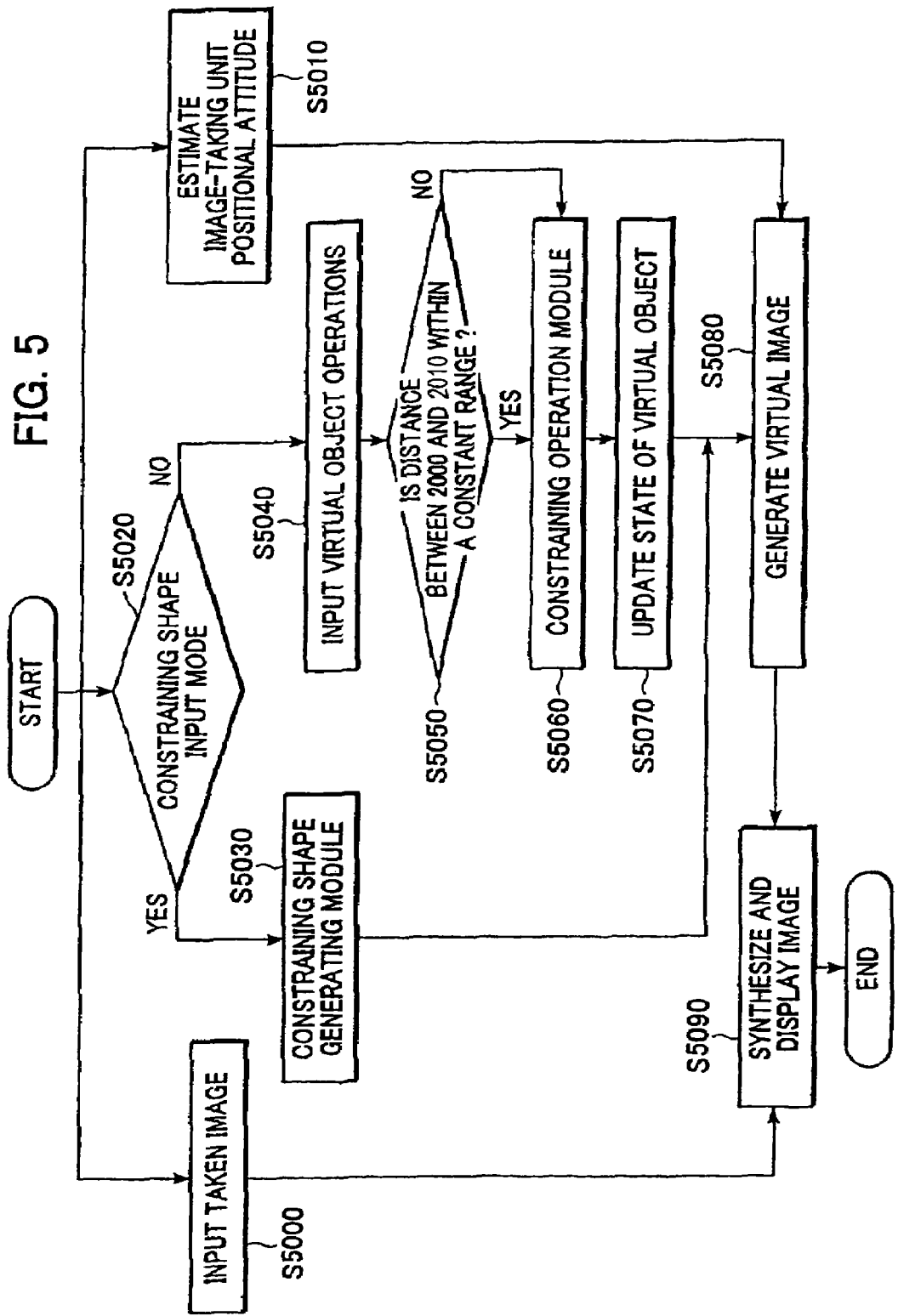
FIG. 5 is a flowchart illustrating the procedures for processing with the first embodiment.

The procedures for processing according to the present embodiment will be described with reference to the flowchart in FIG. 5.

In step S5000, an image taken with the image-taking unit 1010 is input to the taken-image obtaining unit 1040.

In step S5010, the measurement values from the image-taking unit position and orientation measurement unit 1020 are input to the image-taking unit position and orientation estimation unit 1050, thereby estimating the position and orientation of the image-taking unit 1010. A 4-by-4 viewing conversion matrix MC for conversion from a world coordinates system to an image-taking unit coordinates system is generated, based on the estimated position and orientation.

In step S5020, selection of whether a constraining shape is to be input or a virtual object is to be operated, is determined by button operation of the constraining shape input unit 1060 by the user. The present invention is not restricted to methods for selecting this operation by button operation of the stylus, and may be applied to methods wherein selection is made from other input devices such as a mouse or keyboard or the like.

In step S5020, in the event that a mode for inputting a constraining shape is selected, the flow proceeds to step S5030. Or, in the event that a mode for operating a virtual object is selected, the flow proceeds to step S5040.

Figure 10:
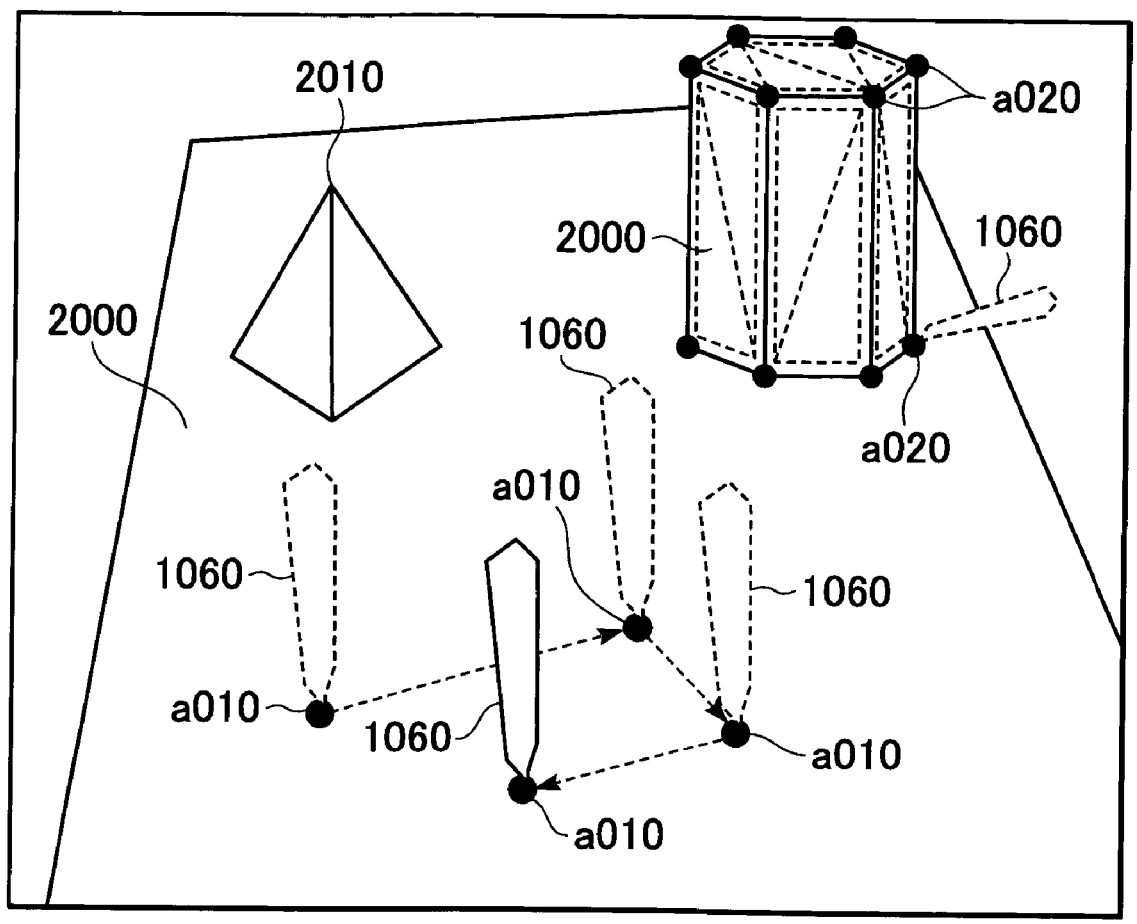
FIG. 10 is a model diagram illustrating inputting of the constraining shape in the real space.

In step S5030, the constraining shape input unit 1060 inputs points of an object in real space, and generates a constraining shape. FIG. 10 is a model diagram illustrating the manner in which a constraining shape in real space is input. The details of step S5030 will be described later.

In step S5040, the virtual objects 2010 is operated from the virtual object operating unit 1090. The change of position and orientation at the virtual object operating unit 1090 due to the input of operations is stored.

In step S5050, positions between the constraining shape 2000 input at the operation aiding unit 1100 and the virtual object 2010 updated by operations are compared, and in the event that the distance therebetween is smaller than a predetermined threshold value, the flow proceeds to step S5060 since restrictions of the constraining shape apply. In the event that the value is greater than the threshold value, operations can be performed without the restrictions of the constraining shape, so the flow proceeds to step S5070. Now in a case wherein translation transformation or rotation transformation is performed under constraint of a constraining plane 2000A (not shown) where the virtual object 2010 currently is, in the event that the virtual object following conversion overlaps a separate constraining plane 2000B (not shown), the restriction applied is that of either the center of gravity of the virtual object 2010 or the center of gravity of the constraining plane 2000, whichever is closer distance-wise.

In step S5060, the operations of the virtual object 2010 are corrected based on the constraining plane 2000. Details will be described later.

In step S5070, the state of the virtual object within the virtual object placement shape storage unit 1070 is updated, according to the results of operation of the virtual object.

In step S5080, the virtual object 2010 of the image-taking unit position and orientation estimation unit 1050 is converted by the viewing conversion matrix MC obtained in step S5010, and further is subjected to two-dimensional projection with a known projection matrix.

In step S5090, the virtual image obtained in step S5080 is superimposed on the taken image obtained in step S5000, and displayed on the display units 1030 by the MR image output unit 1130.

<2.1. Details of Procedures for Constraining Shape Generating Processing>

Figure 6:
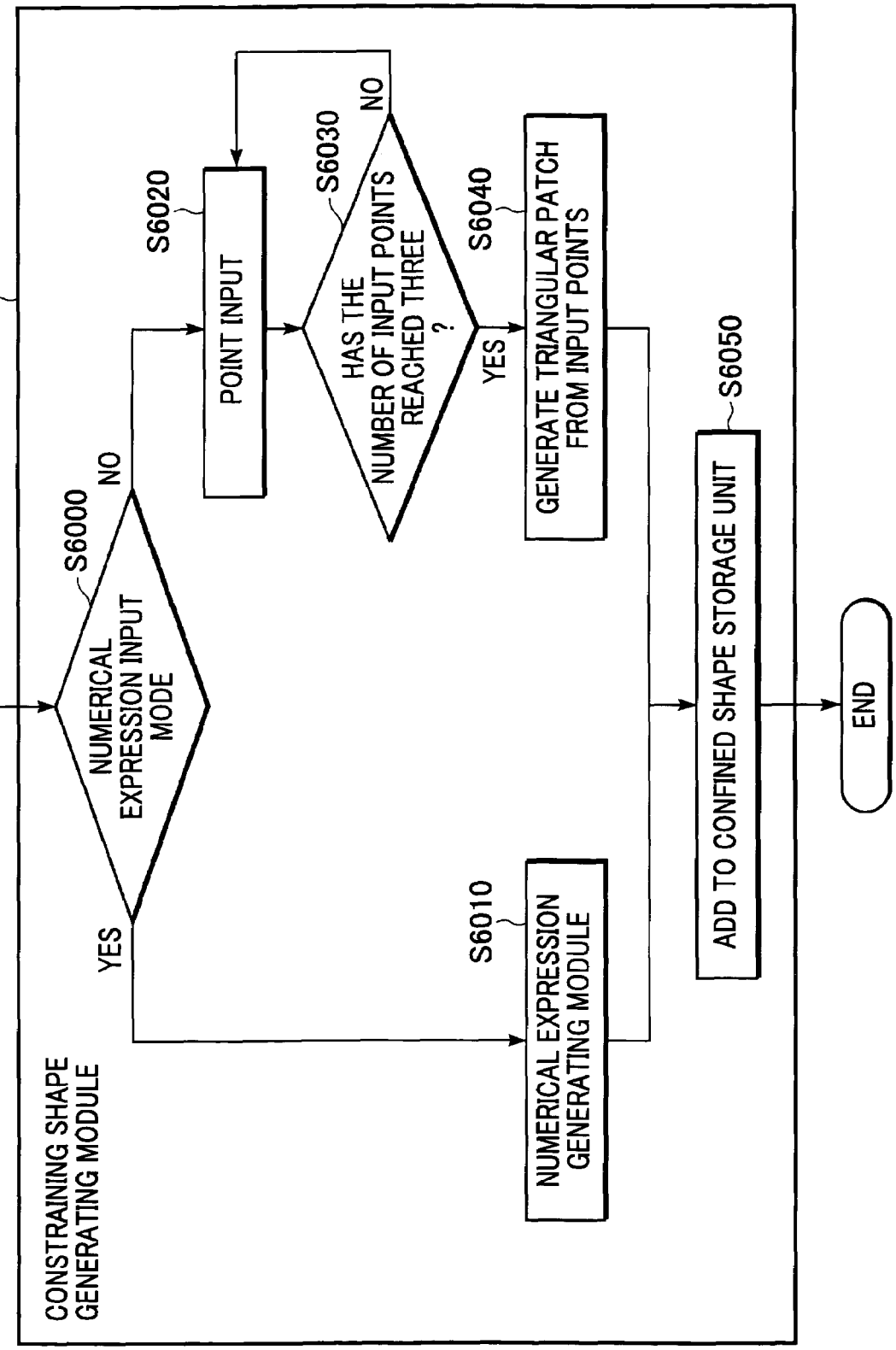
FIG. 6 is a flowchart illustrating the detailed processing procedures relating to generating a constraining shape in step S5030.

FIG. 6 is a flowchart illustrating the detailed processing procedures relating to generating a constraining shape in step S5030. In step S6000, whether to generate a numerical expression model from input points or to generate a shape model, is selected by the user, by operating the button on the stylus. The present invention is not restricted to methods for selecting this operation by button operation of the stylus, and may be applied to methods wherein selection is made from other input devices such as a mouse or keyboard or the like. In the event that the mode for generating numerical expression model is selected, the flow proceeds to step S6010.

In step S6010, a numerical expression model is generated based on the object data in the real space which has been input. Details of the procedures for processing will be described later. The parameters of the numerical expression model generated are added to the constraining shape storage unit 3010 in step S6050.

In step S6020, points of an object in real space (three-dimensional position) to be registered as a constraining shape are received from the constraining shape input unit 1060. The points a020 in FIG. 10 illustrate points on an object to become a constraining shape.

In step S6030, in the event that the number of points input in step S6020 is less than three, the flow returns to step S6020, and awaits input of points. In the event that three points in the real space have been input, the flow proceeds to step S6040.

In step S6040, a triangular patch (a triangular patch defined by the points a020 in FIG. 10) is generated from the three three-dimensional points that have been input. In the event of inputting a hexagonal pillar shape in real space as shown in FIG. 10 as the constraining shape, a triangular patch is generated on the surface by inputting apexes of the hexagonal pillar shape as shown in FIG. 10. At this time, the three input points section the surface of the hexagonal pillar shape into triangles. Now, an arrangement may be made wherein translucent polygons corresponding to the virtual points and patches are generated and drawn accompanying the input operations for the input points and the generated triangular patch, so that the user can recognize the input of the constraining plane.

In step S6050, the generated numerical expression model or shape model is stored in the constraining shape storage unit 3010.

<2.2. Details of Procedures for Numerical Expression Model Generating Processing>

Figure 7:
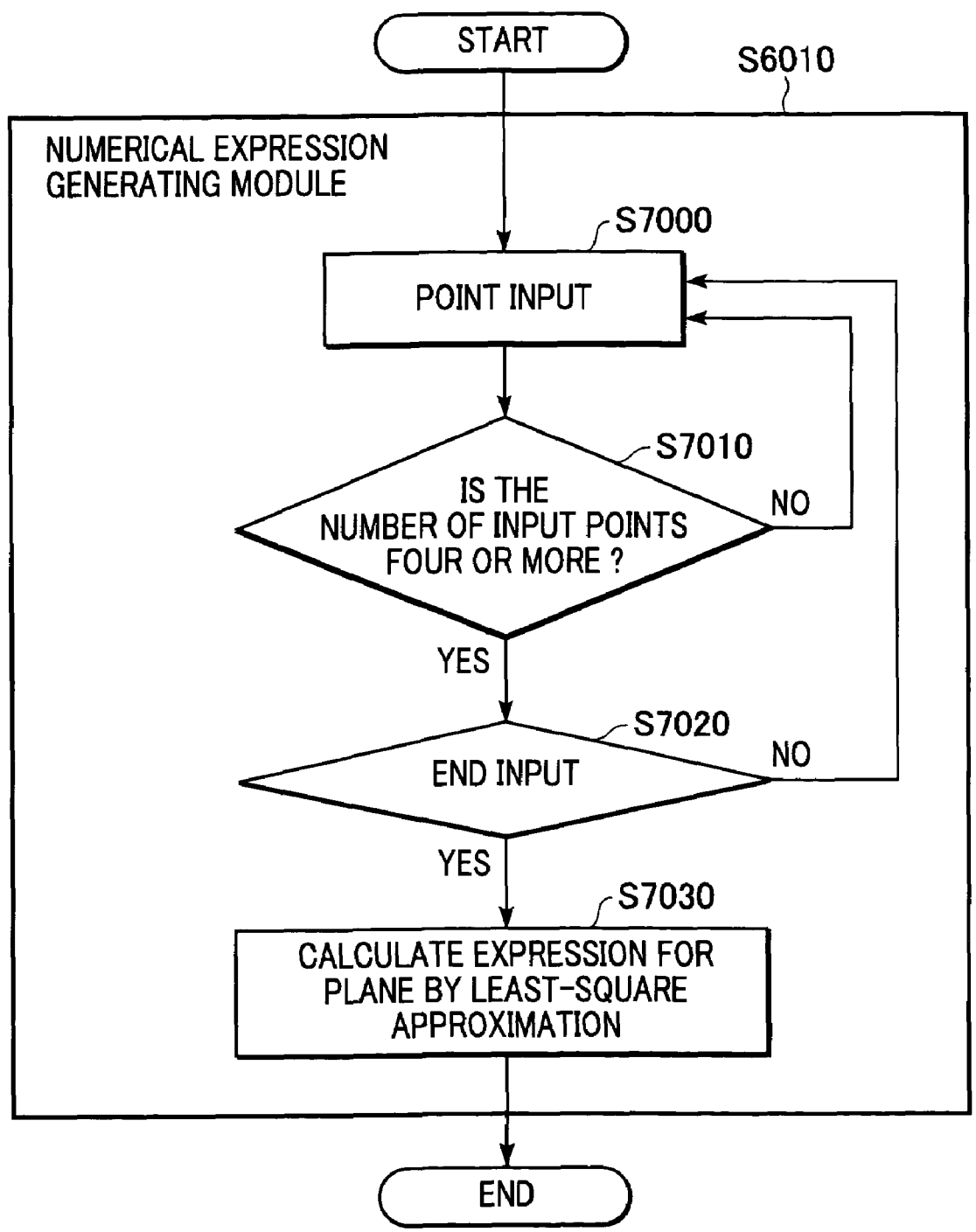
FIG. 7 is a flowchart illustrating the detailed processing procedures relating to generating a numerical expression model of the constraining shape in step S6010.

FIG. 7 is a flowchart illustrating the detailed processing procedures relating to generating a numerical expression model of the constraining shape in step S6010. With the present embodiment, a method is provided wherein a planar numerical expression model is generated from four or more points using least-square approximation, as a numerical expression model generating model for the constraining shape.

First, description will be made regarding a constraining plane suitable for a shape model and a constraining plane suitable for a numerical expression model. A shape model is preferably applied to an object containing apexes on the constraining plane within a range measurable by the constraining shape input unit 1060 which the user has. A constraining shape with higher complexity can be generated by combining constraining planes input this with a shape model. On the other hand, a numerical expression model is preferably applied to an object which has an overall shape greater than the range measurable by the constraining shape input unit 1060. This allows a constraining plane to be set by inputting four or more points on the same plane to be set as the constraining plane within a range measurable by the constraining shape input unit 1060, even for regions wherein the apexes to be input are too distant to be input, such as with the ground. In this case, the numerical expression model of the constraining plane is a model representing an infinite plane.

Next, the method for generating a numerical expression model for an infinite plane with least-square approximation will be described. The expression for a plane used here is $ax+by+cz=1$, which can be represented by vector computation as follows.

[Expression 1]

$$[a \ b \ c] \cdot \begin{bmatrix} x \\ y \\ z \end{bmatrix} = 1$$

This Expression (1) holds for points existing on the plane to be obtained. Assuming that all points in a point group of n points input thus are on the plane, the following expression holds.

[Expression 2]

$$[a \ b \ c] \cdot \begin{bmatrix} x_1 & x_2 & \ldots & x_n \\ y_1 & y_2 & \ldots & y_n \\ z_1 & z_2 & \ldots & z_n \end{bmatrix} = [1 \ 1 \ \ldots \ 1]$$

Now, let us represent this expression as follows.

[Expression 3]

$$p \cdot X = d$$

Obtaining the generalized inverse matrix for X in Expression (3) yields p(a, b, c) which are the parameters of the numerical expression model of the plane. Now, with the generalized inverse matrix for X in Expression (3) as X+, the following expression holds.

[Expression 4]

$$X+ = Xt \cdot (X \cdot Xt) - 1$$

and thus

[Expression 5]

$$p = d \cdot Xt = d \cdot Xt \cdot (X \cdot Xt) - 1$$

The parameters p(a, b, c) of the numerical expression model of the plane can be obtained from the input point group with this Expression (5).

The procedures of the processing for generating a numerical expression model will be described with reference to the flowchart in FIG. 7, based on the above understanding.

In step S7000, points on the plane 2000 in the real space to be registered as the constraining shape are received from the constraining shape input unit 1060. Points a010 in FIG. 10 indicate the points to be input.

Next, in step S7010, in the event that the number of points input in step S7000 is four or more, the flow proceeds to step S7020. In the event that the number of input points is less than four, the flow returns to step S7000 and awaits input of points.

In step S7020, the flow returns to step S7000 and awaits input of points until there is a command to end input of the point group from the user. In the event that there is an end command, the flow proceeds to step S7030.

In step S7030, the input point group is set to the matrix X in the Expression (5), and the parameters p of the numerical expression model of the plane are obtained from the results of calculating Expression (5). Substituting the parameters p obtained here into Expression (1) yields the numerical expression for the plane.

The plane defined by the obtained numerical expression may be drawn using a translucent virtual image. This allows the user to visually recognize the constraining shape, and accordingly easily perform operations of the virtual object which is to be operated.

The present invention is not restricted to having this numerical expression model for planes, and may be applied to methods for numerical expression modeling for various shapes. Further, a method wherein one or multiple modules are provided for numerical expression modeling, or a method for converting into numerical expression models from input of apexes of the shape model, may be used.

<2.3. Details of Procedures for Constraint Processing of Operations of a Virtual Object>

Figure 8:
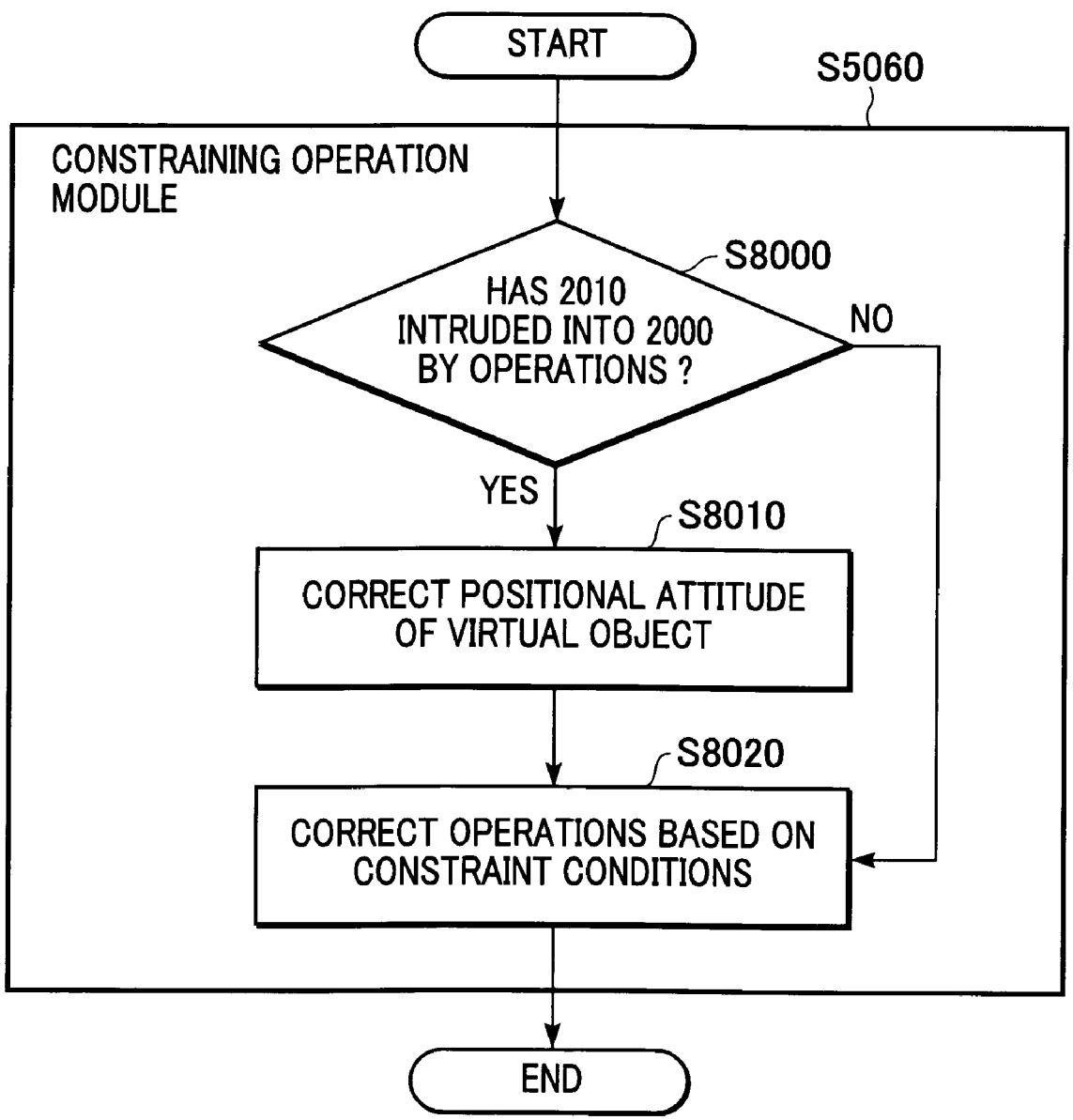
FIG. 8 is a flowchart illustrating the detailed processing procedures relating to generating a numerical expression model of the constraining shape in step S5060.

FIG. 8 is a flowchart illustrating detailed processing procedures for the operations for a constraining shape in step S5060. Here, in the event of operating the virtual object 2010, the user holds the virtual object operating unit 1090 in hand, brings the virtual object operating unit 1090 into spatial contact with the virtual object, and presses a button (not shown) on the virtual object operating unit 1090, whereby the virtual object 2010 hereafter is subject to six-degree-of-freedom operations for the virtual object by synchronizing the amount of change of position and orientation of the virtual object 2010 with the amount of change of the virtual object operating unit 1090. Also, releasing the button on the virtual object operating unit 1090 disengages this synchronization. In this case, the user has the sensation of "grabbing" the virtual object with the virtual object operating unit 1090.

In step S8000, in the event that the virtual object 2010 has come into contact or intruded into the constraining shape 2000 due to the operations of the virtual object performed in step S5040, the flow proceeds to step S8010. Otherwise, the flow proceeds to step S8020.

Figure 9:
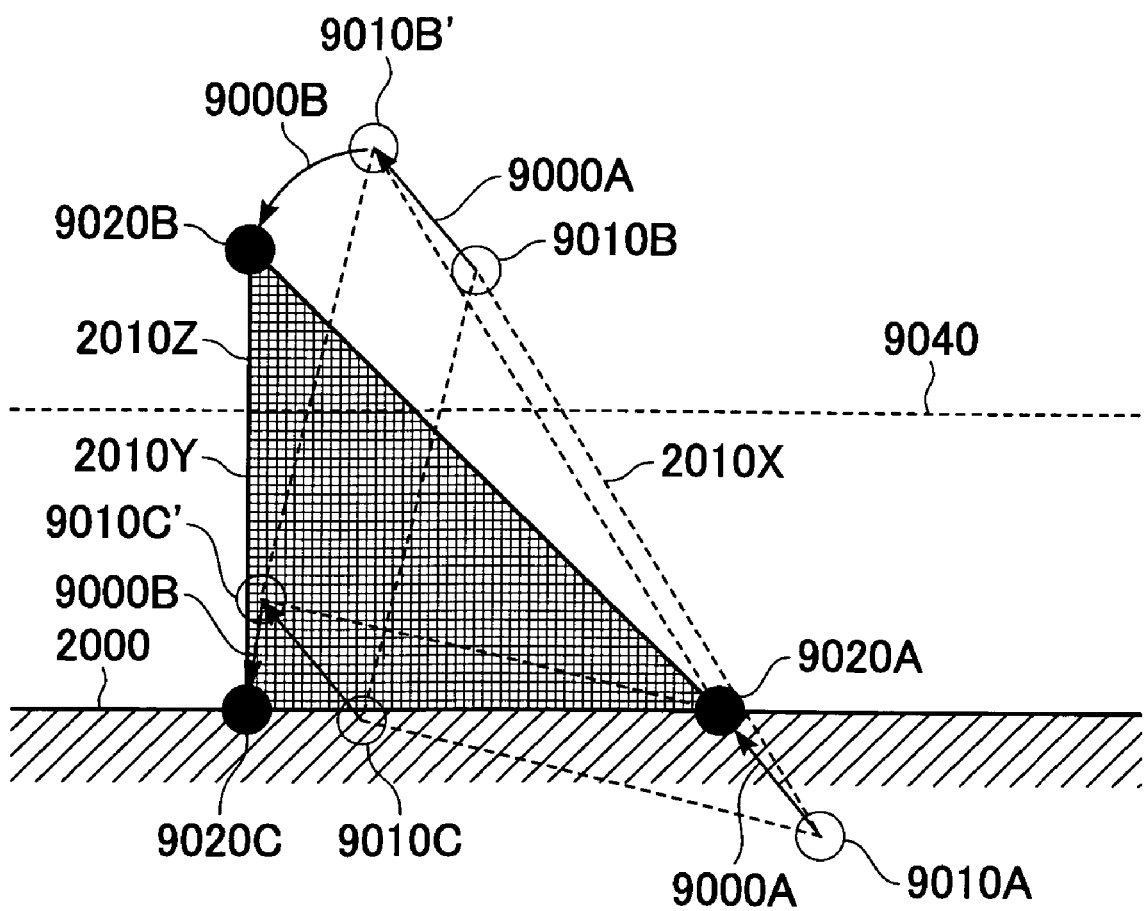
FIG. 9 is a model diagram illustrating the manner in which a virtual object 2010X intrudes into a constraining shape 2000A.

In step S8010, the position and orientation of the virtual object is corrected, based on the position of the constraining shape of the virtual object. This correction method will be described with reference to the model diagram in FIG. 9, illustrating the manner in which the virtual object 2010X is intruding into the constraining shape 2000.

The points 9010A, 9010B, and 9010C in the figure illustrates the apexes of the triangular polygon of the virtual object 2010X intruding into the constraining shape 2000. In step S8010, movement is made to the position of the point 9020 shown here in contact with the constraining plane 2000 and correction is made, by correction conversion indicated by 9000A and 9000B. The correction conversion 9000 disposes the virtual object 2010X before conversion such that one or more of the apexes 9020 of the virtual object come into contact with the constraining shape 2000 at the closest distance from the center of gravity of the virtual object.

First, of the apexes 9010 before conversion, a point 9010A which has intruded into the constraining shape 2000 and also which is the farthest from the constraining shape 2000 is selected. Next, a point 9020A where a straight line, in the opposite direction of the direction in which the virtual object 2010 has intruded into the constraining plane 2000, which passes through the selected point 9010A, intersects with the constraining plane 2000, is obtained. Next, the virtual object 2010X is subjected to parallel movement by the conversion 9000A which moves from 9010A to 9020A. Next, of the other apexes 9010B' and 9010C' making up the triangular polygon of the virtual object following movement, the apex 9010C' which has distance with the constraining plane 2000 that is within the threshold value 9040, is selected, and the virtual object 2010Y is subjected to rotational conversion 9000B with 9020A as the center of rotation thereof, such that 9010C' comes into contact with the constraining plane 2000. In the event that 9010B' is also within the threshold value, the virtual object 2010Y is subjected to rotational conversion 9000B such that both 9010C' and 9010B' come into contact with the constraining plane 2000. The threshold value 9040 may be registered by the user beforehand, or may be dynamically determined by the user according to the situation. The flow then proceeds to step S8020 following correction conversion so as to come into contact with the constraining plane 2000 as described above.

In step S8020, constraint is applied to the operations which the virtual object 2010 is subjected to.

This restriction only permits rotations with the normal of the constraining plane as the axis thereof, and parallel movement parallel to the constraining plane, for the operations on the virtual object. In the event that operations are mode on the virtual object having parallel movement components t(tx, ty, tz)T not parallel to the constraining plane, the effects of constraint are applied by deleting components not parallel to the constraining plane. For example, the translation transformation defined by the world coordinates system is converted into a local coordinates system where there is an XZ plane on the constraining plane by a conversion matrix TWL, and 0 is set to the Y component of the converted parallel movement component. Then, converting the parallel movement component subjected to conversion from the world coordinates system into the local coordinates system by an inverse conversion matrix (TWL)-1 generates the parallel movement components t'(t'x, t'y, t'z)T moving over the constraining plane. The calculation is shown in Expression (6).

[Expression 6]

$$\begin{bmatrix} t'_x \\ t'_y \\ t'_z \\ 1 \end{bmatrix} = T_{WL}^{-1} \cdot [\begin{matrix} 1 & 0 & 1 & 1 \end{matrix}] \cdot T_{WL} \cdot \begin{bmatrix} t_x \\ t_y \\ t_z \\ 1 \end{bmatrix}$$

This constraint is stored within the operation deciding unit 4020. The operation deciding unit 4020 provides the same constraint to the virtual object until the virtual object intrudes into another constraining plane 2000 again such that the target constraining plane is changed.

Due to such constraints being applied to the operations of the virtual object 2010, the user can visually feel the touch and weight of the constraining shape with regard to operations of the virtual object, and can operate the virtual object 2010 intuitively.

First Modification

Figure 11:
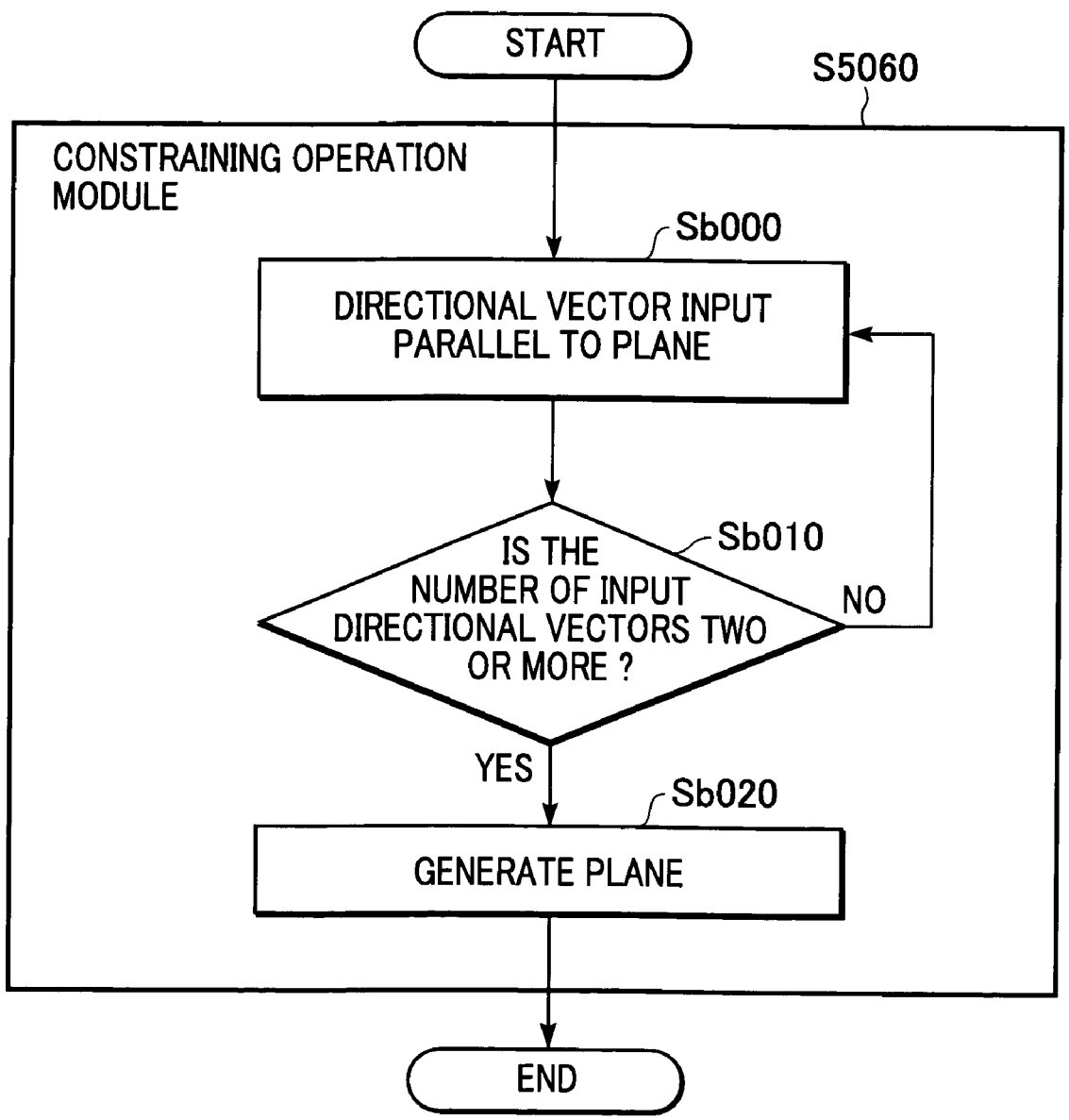
FIG. 11 is a flowchart illustrating the detailed processing procedures relating to generating a numerical expression model for a constraining shape, according to a first modification.
Figure 12:
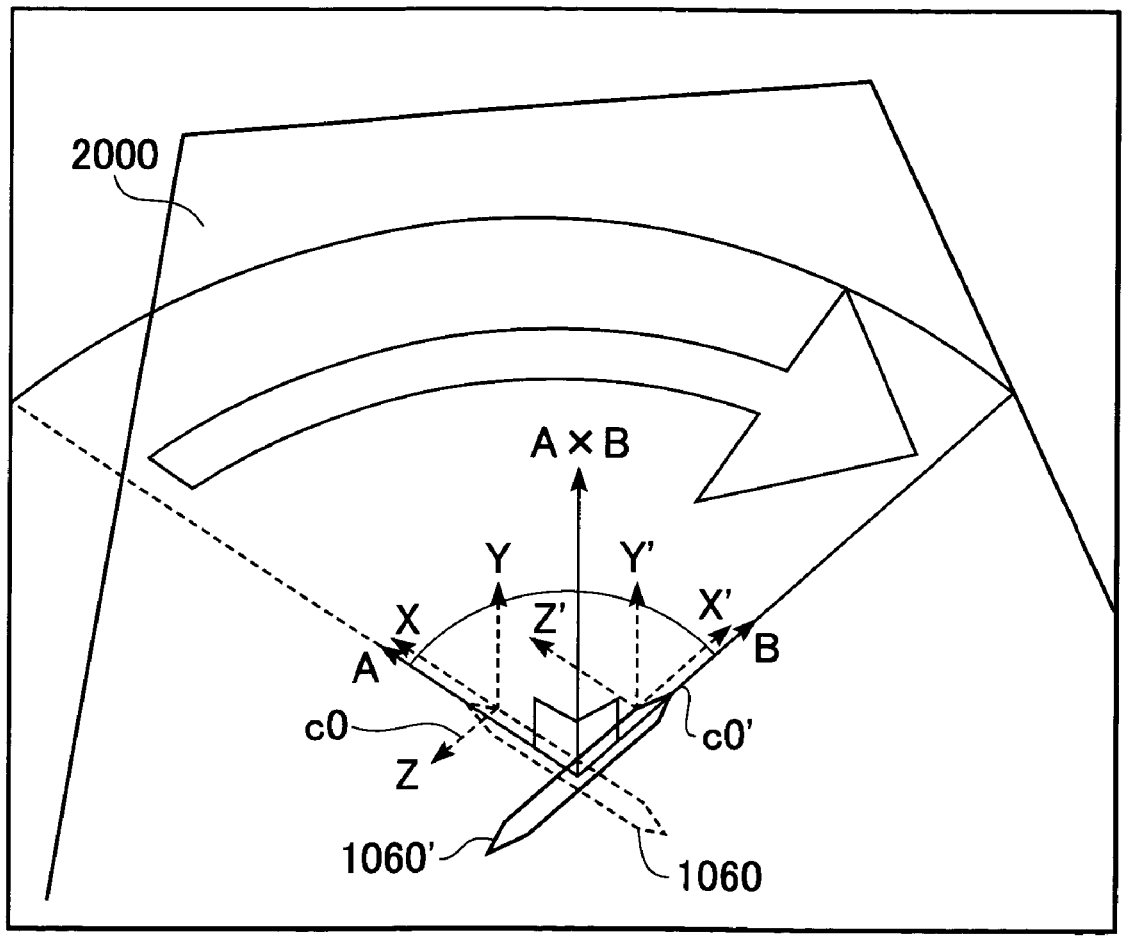
FIG. 12 is a model diagram illustrating the method for generating a numerical expression model for a constraining shape, according to a first modification.

With the numerical expression model generating module in step S6010 in the embodiment described above, a planar numerical expression model was calculated by inputting points, but the present invention is not restricted to this method. Rather, a planar numerical expression model may be calculated by inputting two directional vectors. FIG. 11 is a flowchart of a numerical expression model generating module S6010 using two directional vectors, and FIG. 12 is a model diagram illustrating the method for generating this numerical expression model. This example will be described following the flowchart in FIG. 11.

First, in step Sb000, a straight line parallel to the constraining plane 2000 is input by the constraining shape input unit 1060. Now, the constraining shape input unit 1060 must be placed so as to be parallel to the constraining plane 2000 on the real object, as shown in FIG. 12. Defining the attitude of the constraining shape input unit 1060 here as c0 as shown in FIG. 12, the X-axial direction of c0 is parallel to the constraining plane 2000.

Next, in step Sb010, the flow returns to step Sb000 until two or more direction vectors are input, and input processing is continued. Now, the flow proceeds to step Sb020 upon inputting the X-axial direction B of the attitude c0' of the constraining shape input unit 1060', as shown in FIG. 12.

Next, in step Sb020, calculating the cross product of the direction A and the direction B yields a normal line of a plane containing the two direction vectors. Since these two direction vectors are parallel to the constraining plane 2000, the plane wherein A×B is the normal is also parallel to the constraining plane 2000. Here, the plane having a normal of A×B, passing through a measurement point and a point P obtained by drawing a perpendicular line to the constraining plane from the measurement point, serves as the constraining plane. With the expression of the plane as

[Expression 7]

$$ax+by+cz+d=0,$$

the components of the normal vector obtained correspond to (a, b, c), since the normal is A×B. Thus, the constant d can be obtained by substituting the values of the components of the normal and the point P into Expression (7), and accordingly, the numerical expression can be obtained for the constraining plane 2000.

Second Modification

Figure 13:
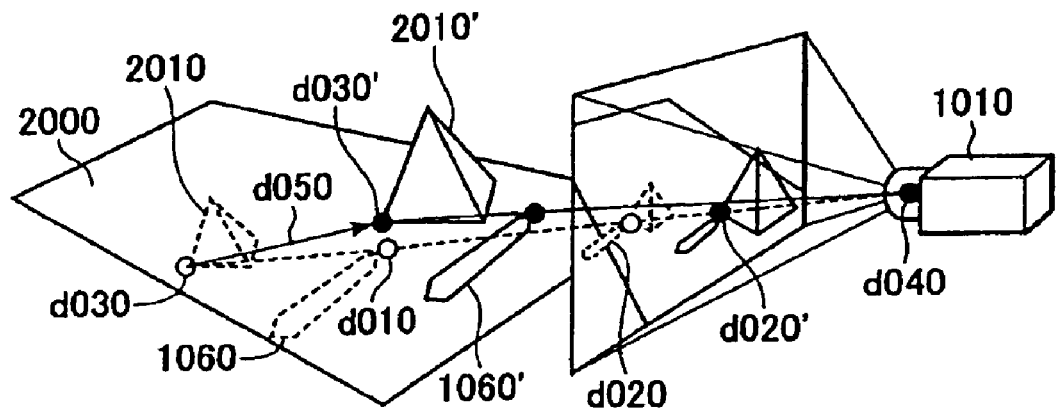
FIG. 13 is a bird's-eye view from the rear left side, illustrating the state in which a virtual object is being operated.
Figure 14:
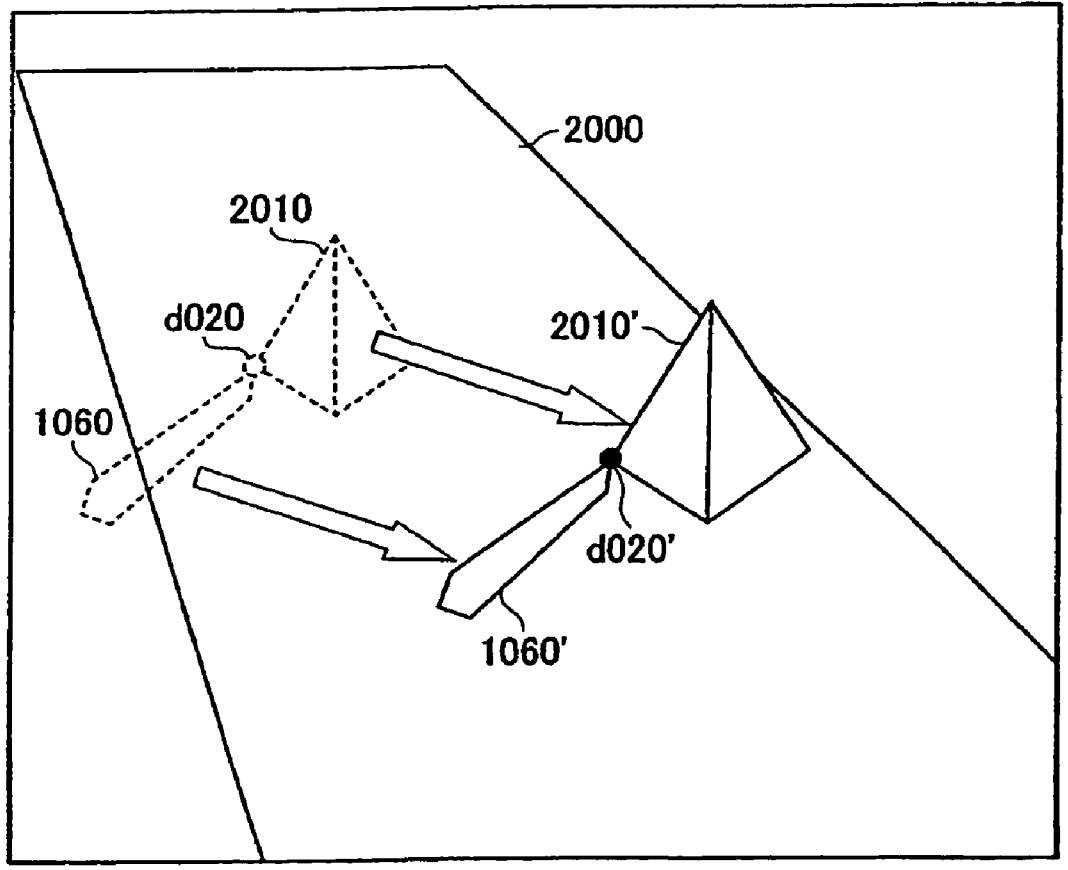
FIG. 14 is a model diagram of an MR image, wherein an image taken with an image-taking unit 1010 which a user is viewing, and a virtual image, are synthesized.

A modification of the method for aiding operations of a virtual object in compounded real space using a constraining plane generated in the above-described embodiment will be described. This virtual object operating method will be described with reference to the model diagrams in FIGS. 13 and 14. The configuration of the equipment for this operating method example is the same as that described above. FIG. 13 is a bird's-eye view illustrating the state in which a virtual object is being operated, and FIG. 14 is a diagram of an MR image which a user is viewing. Using this method enables the virtual object operating unit 1090 of the user to intuitively operate virtual objects which are farther away than the extent of the range where the virtual object operating unit 1090 can reach.

First, the virtual object 2010 is placed on the constraining plane 2000 set beforehand. The virtual object 2010 is operated by the virtual object operating unit 1090, but there is no need for the virtual object operating unit 1090 to be in contact with virtual object 2010 in a three-dimensional manner; rather, operations for the virtual object are performed such that the depth-wise direction of the MR image which the user is viewing is ignored, and in this state, in the event that the virtual object operating unit 1090 comes into contact therewith in two-dimensional space and the user further presses the button (not shown) provided on the virtual object operating unit 1090, the two-dimensional position d020 of the virtual object operating unit 1090 on the screen and the two-dimensional position of the virtual object 2010 is synchronized. In the event that the user releases the button, the virtual object 2010 is no longer synchronized with the virtual object operating unit 1090, and the parallel movement of the virtual object ends. In this case, even in the event that the user performs six-degree-of-freedom operations with the virtual object operating unit 1090, the operations applied to the virtual object 2010 are constraining to parallel movement on the constraining plane alone.

The two-dimensional position on the MR image is necessary for both in order to detect contact of the virtual object operating unit 1090 and the virtual object 2010 on the MR image. The two-dimensional position (P'x, P'y)T is obtained by the three-dimensional position (Px, Py, Pz)T of both on a world coordinates system (d010 and d030 in FIG. 13) being converted to a camera coordinates system by a viewing conversion matrix MC which is a 4-by-4 homogenous coordinates conversion matrix from the position and orientation of the image-taking unit 1010 obtained by the image-taking unit position and orientation measurement unit 1020, and then being subjected to two-dimensional projection on an image coordinates system by a projection matrix MP which is a known 4-by-3 homogenous coordinates conversion matrix. Expression (8) shows this calculation.

[Expression 8]

$$\begin{bmatrix} P'_x \\ P'_y \\ 1 \end{bmatrix} = M_P \cdot M_C \cdot \begin{bmatrix} P_x \\ P_y \\ P_z \\ 1 \end{bmatrix}$$

Further, in order to convert the parallel movement in the two-dimensional space into parallel movement in three-dimensional space parallel with the constraining plane, the starting point d020 of the virtual object operating unit 1090 on the two-dimensional plane and the end point d020' are obtained, intersections (d030, D030') between lines passing through the projected two-dimensional positions (d020, d020') of each from the point of origin d040 on the camera coordinates system and the constraining plane 2000 on the camera coordinates system, are obtained. Next, with the amount of parallel movement of a vector heading for the starting point d030 to the end point d030' on the constraining plane as d050, this amount of parallel movement d050 is subjected to coordinates conversion on the world coordinates system by the inverse matrix MC-1 of the model view matrix. Moving the virtual object using the amount of parallel movement obtained on the world coordinates system allows the virtual object operating unit 1090 and the virtual object 2010 to be synchronously operated on the MR image.

Other Embodiments

Arrangements wherein software program code for realizing the functions of the above-described embodiments is supplied to a computer in a system or an apparatus connected to various devices so as to cause the various devices to realize the functions of the embodiments described above, and invention is carried out by the computer (CPU or MPU) of the system or apparatus operating the various devices following the stored program, are also encompassed by the present invention.

In this case, the software program code itself realizes the functions of the above-described embodiments, and the program code itself, and means for supplying the program code to the computer, e.g., a storing medium storing program the code, comprise the present invention. Examples of storing mediums which can be used for storing the program code include floppy (R) disks, hard disks, optical disks, magneto-optical disks, CD-ROMs, magnetic tape, non-volatile memory cards, ROM, and so forth.

Also, it is needless to say that the present invention encompasses cases not only where the computer executing the supplied program code realizes the functions of the above embodiments, but also where the program code cooperatively realizes the functions of the above embodiments with the operating system or other applications running on the computer.

Further, the scope of the present invention also encompasses arrangements wherein the supplied program code is written to memory provided to function expansion boards in the computer or function expansion units connected to the computer, following which a CPU or the like provided to the function expansion boards or function storing units performs all or part of the actual processing based on instructions of the program code, so as to realize the functions of the above embodiments thereby.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information processing device, comprising:
   an image-capturing unit constructed to capture a real object in real space into a taken image;
   a position and orientation unit constructed to estimate a position and orientation of said image-capturing unit;
   a constraining shape input unit constructed to specify three-dimensional coordinates respectively of points on a constraining plane to indicate at the same time the shape and position of the constraining plane in the real space;
   a constraining shape generation unit constructed to generate a triangular patch from three points sequentially input by said constraining shape input unit and to generate a constraining shape based on at least the constraining plane;
   a virtual image generation unit constructed to generate a virtual image of a virtual object with respect to the position and orientation of said image capturing unit;
   a synthesizing unit constructed to synthesize the virtual image generated by said virtual image generation unit with the taken image generated by said image-capturing unit;
   a virtual object operating unit constructed to perform six-degree-of-freedom operations of the virtual object;
   an operation aiding unit constructed to generate restrictions on the operations performed by said virtual object operating unit based on the constraining shape generated by said constraining shape generating unit; and
   a display unit constructed to translucently display the triangular patch generated by said constraining shape generation unit.

2. An information processing device according to claim 1, wherein said operating aiding unit performs at least one of the following operations in performing an operation controlling the position and orientation of the virtual object:
   a translation operation for causing translational movement of the virtual object based on the constraining shape; and/or
   a rotation operation for rotating the virtual object on an axis which is a normal vector at a plane where the constraining shape and the virtual object come into contact.

* * * * *